United States Patent

Bogaerts

(10) Patent No.: US 12,365,617 B2
(45) Date of Patent: *Jul. 22, 2025

(54) GLASS SHEET WITH HIGH NEAR-IR TRANSMISSION AND VERY LOW VISIBLE TRANSMISSION

(71) Applicant: AGC GLASS EUROPE, Louvain-la-neuve (BE)

(72) Inventor: Michel Bogaerts, Gosselies (BE)

(73) Assignee: AGC GLASS EUROPE, Louvain-la-neuve (BE)

( * ) Notice: Subject to any disclaimer, the term of this patent is extended or adjusted under 35 U.S.C. 154(b) by 966 days.

This patent is subject to a terminal disclaimer.

(21) Appl. No.: 17/600,372

(22) PCT Filed: Mar. 24, 2020

(86) PCT No.: PCT/EP2020/058137
§ 371 (c)(1),
(2) Date: Sep. 30, 2021

(87) PCT Pub. No.: WO2020/200912
PCT Pub. Date: Oct. 8, 2020

(65) Prior Publication Data
US 2022/0250965 A1    Aug. 11, 2022

(30) Foreign Application Priority Data
Apr. 3, 2019 (EP) .................................... 19167078

(51) Int. Cl.
*C03C 3/087* (2006.01)
*C03C 4/02* (2006.01)
*C03C 4/08* (2006.01)

(52) U.S. Cl.
CPC .............. *C03C 3/087* (2013.01); *C03C 4/02* (2013.01); *C03C 4/08* (2013.01); *C03C 2204/04* (2013.01)

(58) Field of Classification Search
CPC .............. C03C 3/087; C03C 4/02; C03C 4/08
See application file for complete search history.

(56) References Cited

U.S. PATENT DOCUMENTS

| 5,905,047 | A | 5/1999 | Sasage et al. |
| RE37,514 | E | 1/2002 | Sasage et al. |
| 9,950,946 | B2 * | 4/2018 | Dogimont ................ C03C 4/10 |
| 10,577,275 | B2 * | 3/2020 | Lambricht ............... C03C 4/02 |
| 2014/0154440 | A1 | 6/2014 | Iida et al. |
| 2016/0304389 | A1 * | 10/2016 | Dogimont .............. C03C 3/087 |
| 2018/0194667 | A1 * | 7/2018 | Lambricht ............ C03C 4/0092 |

FOREIGN PATENT DOCUMENTS

| CN | 101643317 | A | * | 2/2010 | |
| SU | 1 706 979 | A1 | | 1/1992 | |
| WO | WO-2016202606 | A1 | * | 1/2016 | ............ C03C 3/087 |
| WO | WO-2016202689 | A1 | * | 12/2016 | ............ C03C 3/087 |

OTHER PUBLICATIONS

International Search Report issued on May 28, 2020 in PCT/EP2020/058137 filed on Mar. 24, 2020.

* cited by examiner

*Primary Examiner* — Elizabeth A. Bolden
(74) *Attorney, Agent, or Firm* — Oblon, McClelland, Maier & Neustadt, L.L.P.

(57) ABSTRACT

A glass sheet of silicate-type showing intrinsically a very low visible transmission with high IR transmission at wavelengths of interest (i.e., 850, 900 and 950 nm), and low amounts of $Cr^{6+}$ species, valuable within the context of autonomous cars, and in particular those fully integrating LiDAR systems. The glass sheet having a composition in a content expressed as weight percentages, by total weight of glass:

| Total iron (expressed as $Fe_2O_3$) | 0.04-1.7%, |
| Chromium (expressed as $Cr_2O_3$) | 0.05-0.8%, |
| Cobalt (expressed as Co) | 0.03-0.175%, | where:
$Cr_2O_3 < 1\text{-}5.5Co$, and $0.5 < Cr_2O_3/Fe_2O_3 \leq 1.2$.

20 Claims, No Drawings

GLASS SHEET WITH HIGH NEAR-IR TRANSMISSION AND VERY LOW VISIBLE TRANSMISSION

1. TECHNICAL FIELD OF THE INVENTION

The present invention relates to a silicate glass sheet with a high transmission in the near infrared region, but with a very low transmission in the visible range.

This invention is particularly suitable within the context of autonomous cars, in particular those fully integrating LiDAR systems.

2. DESCRIPTION OF THE PRIOR ART

The need for IR applications is continuously growing, in particular with the current spectacular development of autonomous cars, largely relying on LiDAR systems. Today, the trends and demand from the market is to have those LIDAR systems fully integrated in the car (for numerous evident reasons like aesthetic and preventing damages to the system) and, in particular, mounted behind internal face of one or more of its glazings (rear window/rear windshield/back windshield and/or glass trims). The last developments in LIDAR technologies for autonomous cars use two main wavelength ranges of interest, namely 800-1100 nm (especially 850, 950 and 1050 nm) and 1500-2000 nm (especially 1550 nm).

Regular glasses used in automotive (clear, colored, coated, etc) are of soda-lime-silicate type and have the advantages, amongst others, to be highly mechanically, chemically and ageing resistant, with limited costs. However, those glasses show such a poor near-IR transmission that the use of LIDAR systems mounted behind is not feasible due to high IR signal loss by absorption in said glass.

Recently, it has been proposed to use a specific glass composition which allows getting a glazing with a significantly higher transmission in the near IR region, in particular in the range 800-1100 nm (absorption coefficient $<5\ m^{-1}$), while keeping the high level in visible transmission requested for vision glazing in cars (rear window/rear windshield/back windshield). This solution is described notably on PCT publication WO2018/015312A1. However, as these described glass compositions show a high visible transmission, any element placed behind, like the LIDAR system, is visible from the outside of the car and thereby greatly deteriorate its aesthetics.

It has recently been proposed in WO2018/015313A1 to combine the known IR transmissive glass sheet with an IR transparent tinted/opaque coating in order to hide the unaesthetic element of the LIDAR system from the outside while ensuring a good level of operating performances of said system. This coating may, for example, be a layer of black ink or a black film having no (or very low) transmission in the visible range but having a high transmission in the infrared range of interest for the application. Such ink or film are generally made of organic compounds. Unfortunately, this solution of combining a "clear" or transparent glass sheet with a black layer/film has several drawbacks like the poor resistance of the layer/film (compared to the glass itself) thereby weakening the assembly and also the fact that it requires to laminate this coated glass sheet with another sheet. Finally, it is really difficult to curve/bend in various shapes a glass sheet covered with such a black layer/film.

Out of the context of autonomous cars and LIDAR technologies, the art has also proposed some glasses being highly colored to opaque in the bulk and showing also very good transmission performances in the near IR range:

Special glasses named Chalcogenide glasses are based on chalcogens (Sulphur S, Selenium Se or Tellurium Te) and do not contain oxygen. Chalcogenide glasses are indeed known as having a large transparency window in the infrared and some compositions can be opaque to visible radiations. However, such glasses have two major drawbacks. First, chalcogenide glasses have very poor mechanical resistance. For instance, reported hardness values for chalcogenide glasses range between 0.39-2.35 GPa (compared to 4.8-5.0 GPa for soda-lime-silicate glasses). Secondly, chalcogenide glasses are known for their high expensiveness: in addition to very expensive raw materials, no oxygen contamination is tolerated during the synthesis of chalcogenide glass, which require complicate production furnaces with inherent limitation in term of size, quantity and price of glass pieces. Finally, chalcogenide glasses pose also some severe environmental issues. These drawbacks clearly prevent their use in replacement of classically used soda-lime-silicate glasses, i.e. in the automotive field.

a specially designed soda-lime-silicate glass composition is described in the European patent application n°18194808.4 in the same context. It comprises, in a soda-lime silicate based matrix, iron, manganese and optionally chromium in specific amounts and shows a very intense color to opacity together with good performance in terms of near IR transmission. Unfortunately, its IR transmission reaches high values only for limited wavelengths, especially 1050 nm and 1550 nm, which prevents its use for the LIDAR technologies requesting high IR transmission for lower wavelengths, i.e. 850-950 nm.

another specially designed soda-lime-silicate glass composition is described in WO2015/091106 in the context of IR touch displays. It comprises, in a soda-lime silicate based matrix, chromium and cobalt in specific amounts and shows a very intense color to opacity together with good performance in terms of near IR transmission for wavelengths between 850-950 nm. In particular, the suitable IR-transmissive glass composition examples from WO2015/091106 comprises high amount of chromium to reach/approach opacity while keeping low amount of total iron (below 600 ppm). Unfortunately, such ranges leads to significant amount of hexavalent chromium or $Cr^{6+}$ species in the final glass composition/product. Tough, $Cr^{6+}$ is generally an undesired species in product mainly for environmental and health reasons. Concentrations in $Cr^{6+}$ in products is limited by regulations (RoHS directive (2011/65/EU, (EU)2015/863 and ELV directive (2000/53/EC,(EU) 2016/774)) and is fixed at: $Cr^{6+}<0.1$ wt %. Computed $Cr^{6+}$ amounts in examples 6 and 7 from WO2015/091106 reach about 467 and 339 ppm, respectively. These contents are below the limits imposed by present regulations, but (i) these limits would probably become more restrictive in the near future and (ii) some customers currently ask for almost the absence of $Cr^{6+}$ in the glass product.

Hence, the state of the art does not provide any solution to provide a (soda-lime-)silicate type glass with a high near IR transmission in the specific range 850-950 nm, together with a very low or zero visible transmission, without the need of an additional black/opaque layer/film and with a low $Cr^{6+}$ content (at least lower compared to prior art glasses with equivalent IR transmission performances).

Though, in a context of quick development and eager market request for operational autonomous cars combined with increased request of the consumers for aesthetic, there is clearly a need to have a silicate-type glass sheet showing a high transmission in the near IR range and especially 850-950 nm, having intrinsically a very low or close to zero transmission in the visible range (meaning highly colored to opaque in the bulk) and showing a low amount of $Cr^{6+}$. Such a glass sheet mounted in a car (i.e. as a trim) would then allow placing a LIDAR system (for example, using wavelength(s) in the range 850-950 nm) behind its internal face while, at the same time:

- ensuring good performances of the LIDAR system;
- hiding the unaesthetic element(s) of said system from the outside of the car;
- preserving the level of intrinsic resistance (mechanical, chemical, ageing) of regular glass;
- having limited risks for environment and health; and
- achieving reasonable costs.

Next to that, due to its low visible transmission, such a glass sheet would also bring the additional advantage of improving performances of the detector itself integrated in the LIDAR system. Indeed, generally the used IR detectors are also sensitive to some visible radiations, thereby suffering undesired noise background if the glass sheet in front of the LIDAR system is too transmissive in the visible region.

Finally, alternatively or in combination with previously cited uses, such a glass sheet would also be very useful as cover lens for the LIDAR sensors themselves. Conventional cover lenses are made of plastic which provide proper infrared transmission but are very poor in terms of durability. Plastics offer indeed poor mechanical and chemical resistances. Basically, glass would be a material of choice as a result of its mechanical properties, its durability, its resistance to scratching and also because it can be, if required, chemically or thermally strengthened. Furthermore, compared to plastic, glass, because of its higher melting point and lower CTE, is more appropriate when heated, i.e. when combined with a defrosting system in automotive application.

3. OBJECTIVES OF THE INVENTION

The present invention has notably the objective of overcoming the cited drawbacks of the prior art.

More precisely, one objective of the invention is to provide a silicate type glass sheet with a high near IR transmission in the region 850-950 nm, together with (i) a very low visible transmission while not deteriorating the resistance property of the sheet and with (ii) limited risks for environment and health.

In particular, an objective of the invention is to provide a silicate type glass sheet with a high near IR transmission in the range 850-950 nm, together with (i) a very low visible transmission, due to its intrinsic properties thereby without the need of an additional black/opaque layer/film, and with (ii) a low amount of hexavalent chromium, $Cr^{6+}$.

Another objective of the invention is to supply a solution to the disadvantages of the prior art that is simple to manufacture and inexpensive.

4. DETAILED DESCRIPTION OF THE INVENTION

The invention relates to a glass sheet of silicate-type having a composition comprising, in a content expressed as weight percentages, by total weight of glass:

| | |
|---|---|
| total iron (expressed as $Fe_2O_3$) | 0.04-1.7%, |
| Chromium (expressed as $Cr_2O_3$) | 0.05-0.8%, |
| Cobalt (expressed as Co) | 0.03-0.175%, | and having:
$Cr_2O_3 < 1-5.5*Co$,
$0.5 < Cr_2O_3/Fe_2O_3 \; 1.2$.

Hence, the invention lies on a novel and inventive approach since it enables to find a solution for the disadvantages of prior art. The inventors have indeed found that, it is possible to get a glass sheet showing at the same time (i) a very low intrinsic visible transmission, (ii) a high IR transmission in the region 850-950 nm and (iii) a low amount of $Cr^{6+}$ species, by using in an iron-based glass matrix, chromium and cobalt in specific amounts while carefully adjusting, in a narrow range, the ratio between chromium and total iron.

In order to obtain high transmission in the infrared region in soda-lime silicate glasses including intrinsically some amounts of iron coming as an impurity in the majority of the starting materials used, it is known to reduce at maximum the amount of ferrous $Fe^{2+}$ ions in the glass. Indeed, ferrous ions (sometimes expressed as oxide FeO) in soda-lime-silicate glasses absorb in the near infrared region due to their broad absorption band centered on 1050 nm. In known chromium-containing low-iron glasses, chromium is added in an amount adapted to oxidize all $Fe^{2+}$ into $Fe^{3+}$ in order to get high near-IR transmission. As chromium is known since years as a classical powerful colorants for glass, increasing further the chromium content of the glass above the threshold required to fully oxidized iron will bring a strong decreasing of visible transmission while keeping the high level of IR transmission as $Fe^{2+}$ is at zero-amount, as described in WO2015/091106. However, in those glasses, the amount of $Cr^{6+}$ in the composition is high (above 300 ppm). It was surprisingly found by the inventors that it is possible to drastically reduce the amount of $Cr^{6+}$ (while keeping high IR transmission) by carefully adjusting the ratio $Cr_2O_3/Fe_2O_3$ in a matrix richer in iron so that the final glass has both low $Fe^{2+}$ and $Cr^{6+}$ concentrations.

In present description and claims, to quantify the visible transmission (also called luminous transmission/transmittance or TL) of a glass sheet, one considers the visible transmission with illuminant D65 for a sheet thickness of 4 mm (TLD4) at a solid angle of observation of 2° (according to standard ISO9050). The visible transmission (TL) represents the percentage of radiation flux emitted between wavelengths 380 nm and 780 nm which is transmitted through the glass sheet.

In present description and claims also, to quantify the IR transmission, one considers the transmission for a sheet thickness of 4 mm at a solid angle of observation of 2° (according to standard ISO9050), representing the percentage of radiation flux emitted at a specific wavelength in the near IR range namely 850 nm ($T_{850}$), 900 nm ($T_{900}$) and 950 nm ($T_{950}$) which is transmitted through the glass sheet.

Other features and advantages of the invention will be made clearer from reading the following description of preferred embodiments, given by way of simple illustrative and non-restrictive examples.

Throughout the present text, when a range is indicated, the extremities are included, except if explicitly described in another way. In addition, all the integral and subdomain values in the numerical range are expressly included as if explicitly written. Also, throughout the present text, the values of content are in percentage by weight expressed with respect to the total weight of the glass (also mentioned as wt %), except if explicitly described in another way (i.e. in ppm). Moreover, when a glass composition is given, this relates to the bulk composition of the glass.

The term "glass", within the meaning of the invention, is understood to mean a completely amorphous material, thus excluding any crystalline material, even partially crystalline material (such as, for example, glass-crystalline or glass-ceramic materials).

The glass sheet of the invention may be manufactured starting from melting a glass raw materials batch in a glass melting furnace/tank and then forming the resulting molten glass into the desired shape, using a floating process, a drawing process, a rolling process or any other process known to manufacture a glass sheet starting from a molten glass composition. In an embodiment of the invention, the glass sheet is a float glass sheet. The term "float glass sheet" is understood to mean a glass sheet formed by the known float glass process. Other forming/processing treatment may follow the manufacturing process.

By "glass sheet" in present invention, it is meant a glass article in a sheet-like form including flat glass, curved glass, bent glass, lens, etc.

The glass sheet according to the invention may have varied sizes, from small sizes (for example, for cover lenses), through medium sizes (for example, for automotive glazings) to very large sizes (up to "DLF" or "PLF" sizes). The glass sheet according to the invention may also have a thickness of from 0.1 to 25 mm, depending on the targeted applications. Preferably, the glass sheet according to the invention has a thickness of from 1 to 8 mm and, more preferably, from 1.5 to 5 mm.

According to the invention, the composition comprises total iron (expressed in terms of $Fe_2O_3$) as follows: 0.04-1.7 wt %. In present description, when talking about total iron content in glass composition, "total iron" and "$Fe_2O_3$" are used as well and total iron is expressed in terms of $Fe_2O_3$. According to an advantageous embodiment, the composition comprises total iron ≤1.5%. Preferably, the composition comprises total iron ≤1.2%, or even better ≤1%. According to another advantageous embodiment, the composition comprises total iron ≥0.06%. Preferably, the composition comprises total iron ≥0.08%, or even better ≤0.1%.

According to an embodiment of the invention, the composition of the glass sheet is free of manganese. By "free of manganese" according to the invention, it is meant that the composition comprises manganese (expressed as MnO) ≤0.02%. More preferably, the composition comprises manganese (expressed as MnO) ≤0.01%, even ≤0.005%.

According to another embodiment of the invention, the composition of the glass sheet is free of lithium. By "free of lithium" according to the invention, it is meant that the composition comprises lithium (expressed as $Li_2O$) ≤0.1%. More preferably, the composition comprises lithium (expressed as $Li_2O$) ≤0.05%. even ≤0.01%.

According to another embodiment of the invention, the composition of the glass sheet is free of barium. By "free of barium" according to the invention, it is meant that the composition comprises barium (expressed as BaO) ≤0.1%. More preferably, the composition comprises barium (expressed as BaO) ≤0.05%. even ≤0.01%.

According to the invention, the composition has: $0.5<Cr_2O_3/Fe_2O_3≤1.2$. Preferably, the has: $0.5<Cr_2O_3/Fe_2O_3≤1$. More preferably, the composition has: $Cr_2O_3/Fe_2O_3≤0.8$.

According to the invention, the composition comprises chromium (expressed as $Cr_2O_3$) as follows: 0.05-0.8%. Preferably, the composition comprises chromium (expressed as $Cr_2O_3$) ≤0.5%, even better ≤0.4%. More preferably, the composition comprises chromium (expressed as $Cr_2O_3$) ≤0.3%, even more better ≤0.25%. Preferably, the composition comprises chromium (expressed as $Cr_2O_3$) ≥0.08%, even better ≥0.1%. More preferably, the composition comprises chromium (expressed as $Cr_2O_3$) ≥0.15%.

According to the invention, the composition comprises cobalt (expressed as Co) as follows: 0.03-0.175%. Preferably, the composition comprises cobalt (expressed as Co) ≤0.15%, even ≤0.12%. More preferably, the composition comprises cobalt (expressed as Co) ≤0.1%.

According to an embodiment of the invention, the composition comprises an $Fe^{2+}$ content (expressed in the form of FeO) of less than 40 ppm. This range of contents makes it possible to obtain highly satisfactory properties in terms of transmission of the IR radiation. Preferably, the composition comprises an $Fe^{2+}$ content (expressed in the form of FeO) of less than 30 ppm, even less than 20 ppm. Very preferably, the composition comprises an $Fe^{2+}$ content (expressed in the form of FeO) of less than 10 ppm and even better, less than 5 ppm.

According to an embodiment of the invention, the composition comprises a $SO_3$ content as follows: 0.2-0.4%.

According to another embodiment of the invention, the glass sheet has a visible transmission TLD4 lower than 15% and preferably lower than 12%, or even lower than 10%. More preferably, the glass sheet has a visible transmission TLD4 lower than 8%, or even lower than 7%, or better lower than 6%, or even more better lower than 5%. Opacity is improved when TLD4 decreases more and more. Ideally, the glass sheet has a visible transmission TLD4 lower than 3%, even lower than 1%. Complete opacity is reached when TLD4 approaches closely or is equal to 0.

According to another embodiment of the invention, the glass sheet has a transmission $T_{950}$ higher than 80% and preferably higher than 82%. More preferably, the glass sheet has a transmission $T_{950}$ higher than 85% and very preferably higher than 87%. In a very preferred embodiment, the glass sheet has a transmission $T_{950}$ higher than 90%.

According to another embodiment of the invention, the glass sheet has a transmission $T_{900}$ higher than 80% and preferably higher than 82%. More preferably, the glass sheet has a transmission $T_{900}$ higher than 85% and very preferably higher than 87%. In a very preferred embodiment, the glass sheet has a transmission $T_{900}$ higher than 90%.

According to still another embodiment of the invention, the glass sheet has a transmission $T_{850}$ higher than 80% and preferably higher than 85%. More preferably, the glass sheet has a transmission $T_{850}$ higher than 87% and very preferably higher than 90%.

According to still another embodiment of the invention, the composition comprises a $Cr^{6+}$ content 60 ppm. Preferably, the composition comprises a $Cr^{6+}$ content 50 ppm, even 40 ppm. More preferably, the composition comprises a $Cr^{6+}$ content 30 ppm, even 10 ppm. In a most preferred embodiment, the composition is free of $Cr^{6+}$. The $Cr^{6+}$ content in glass can be computed, in a known manner, based on the transmission spectra and the linear absorption coefficients of the cation. These absorption coefficients are based on Bamford data (Bamford, C. R. (1977). Colour generation and control in Glass. Glass Science and Technology, 2, pp 224, Elservier Scientific Publishing Company.)

The glass sheet according to the invention may be a glass sheet obtained by a float process, a drawing process, or a rolling process or any other known process for manufacturing a glass sheet from a molten glass composition. According to a preferred embodiment according to the invention, the glass sheet is a float glass sheet. The term "float glass sheet" is understood to mean a glass sheet formed by the float process, which consists in pouring the molten glass onto a bath of molten tin, under reducing conditions. A float glass sheet comprises, in a known way, a "tin face", that is to say a face enriched in tin in the body of the glass close to the surface of the sheet. The term "enrichment in tin" is understood to mean an increase in the concentration of tin with respect to the composition of the glass at the core, which may or may not be substantially zero (devoid of tin).

The silicate glass sheet according to the invention is made of glass which may belong to various categories. The glass can thus be a glass of soda-lime-silicate, aluminosilicate or borosilicate type, and the like. Preferably, the composition of the glass sheet comprises the following in weight percentage, expressed with respect to the total weight of glass:

| | |
|---|---|
| $SiO_2$ | 40-78% |
| $Al_2O_3$ | 0-18% |
| $B_2O_3$ | 0-18% |
| $Na_2O$ | 0-20% |
| CaO | 0-15% |
| MgO | 0-10% |
| $K_2O$ | 0-10% |
| BaO | 0-5%. |

In an embodiment, the composition of the glass sheet comprises MgO ≥0.1% and preferably, MgO ≥0.5%.

More preferably, notably for low production costs reasons, the glass composition is a soda-lime-silicate-type glass. According to this embodiment, by "soda-lime-silicate-type glass", it is meant that the composition comprises the following in weight percentage, expressed with respect to the total weight of glass:

| | |
|---|---|
| $SiO_2$ | 60-78 wt % |
| $Al_2O_3$ | 0-8 wt % |
| $B_2O_3$ | 0-4 wt % |
| CaO | 0-15 wt % |
| MgO | 0-10 wt % |
| $Na_2O$ | 5-20 wt % |
| $K_2O$ | 0-10 wt % |
| BaO | 0-5 wt %. |

According to this embodiment, preferably, the glass composition comprises the following in weight percentage, expressed with respect to the total weight of glass:

| | |
|---|---|
| $SiO_2$ | 60-78 wt % |
| $Al_2O_3$ | 0-6 wt % |
| $B_2O_3$ | 0-1 wt % |
| CaO | 5-15 wt % |
| MgO | 0-8 wt % |
| $Na_2O$ | 10-20 wt % |
| $K_2O$ | 0-10 wt % |
| BaO | 0-1 wt %. |

In another embodiment of the invention, the composition comprises the following in weight percentage, expressed with respect to the total weight of glass:

$65 \leq SiO_2 \leq 78$ wt %

$5 \leq Na_2O \leq 20$ wt %

$0 \leq K_2O < 5$ wt %

$1 \leq Al_2O_3 < 6$ wt %

$0 \leq CaO < 4.5$ wt %

$4 \leq MgO \leq 12$ wt %

$(MgO/(MgO+CaO)) \geq 0.5$.

In particular, examples of base glass matrixes for the composition according to the invention are described in published PCT patent applications WO2015/150207A1, WO2015/150403A1, WO2016/091672, WO2016/169823 and WO2018/001965.

The composition of the glass sheet can comprise, in addition to the impurities present in particular in the starting materials, a low proportion of additives (such as agents which help the melting or the refining of the glass) or of components originating from the dissolution of the refractories constituting the melting furnaces.

The glass composition of the invention may also comprise some other colorants than those described in relation with present invention (namely iron, cobalt and chromium), as impurities due mainly to particular contaminated raw materials. Examples of such impurities are molybdenum, nickel, copper.

Advantageously, the glass sheet of the invention may be tempered, mechanically or chemically. It may also be bended/curved, or in a general manner, deformed to reach any desired configuration (by cold-bending, thermoforming, . . . ). It may also be laminated.

According to one embodiment of the invention, the glass sheet of the invention may be covered by at least one coating. Examples of such coating are:

a transparent and electrically conducting thin layer (i.e. a layer based on $SnO_2$:F, $SnO_2$:Sb or ITO (indium tin oxide), ZnO:Al or also ZnO:Ga;

an antireflection layer;

an anti-fingerprint layer or has been treated so as to reduce or prevent fingerprints from registering;

a lay-out of black enamel for aesthetics and improvement of bonding;

a network of silverprint for heating function; and/or an anti-soiling and/or hydrophobic layer.

According to the targeted applications and/or properties desired, other layer(s)/treatment(s) can be deposited/done on one and/or the other face of the glass sheet according to the invention.

The glass sheet of the invention can advantageously be used as an automotive glazing, especially as a trim. In such a case, in the context of autonomous cars, a LIDAR system may be fully integrated in the car (thereby guaranteeing aesthetic and preventing damages to the system), mounted behind internal face of said glazing.

Therefore, the invention also relates to the use of the glass sheet according to the invention in:

as an automotive glazing, preferably as a trim element; or as a cover lens for a LIDAR sensor.

Even if the context of present invention has been described with the specific application of car-integrated LIDAR systems, the glass sheet of the invention can also advantageously be used in any other technology requiring very low transmission or a very intense colour for the glass, together with very good performances in the near IR range, especially for 850-950 nm. For example, it can be enhanceable in value in the "Planar Scatter Detection" (PSD) or "Frustrated Total Internal Reflection" (FTIR) optical technology for detecting the position of one or more objects (for example, a finger or a stylus) on a surface of said sheet which, in view of its more or less intense to opaque color, is capable of partially or completely hiding objects/components found behind/under it.

Still as examples of uses, the glass sheet of the invention can also be enhanced in value:
(1) as decorative panel positioned in front of/around radiant heating, hiding (partially or completely) the unattractive side of the heating but allowing the IR radiation to pass and thus making possible a good output from said heating;
(2) as architectural or decorative spandrel glass;
(3) as cooking plate, in replacement of the expensive special glasses commonly used (vitroceram or borofloat or even pyrex);
(4) as pointing device on portable computers (commonly known as "touchpad"), sometimes using a technology requiring infrared radiation. In this case, the glass sheet is preferably very dark, indeed even opaque, in color and thus hides the electronic components located under it;
(5) as front face element of furniture and in particular of furniture intended to include remote controllable electrical/electronic appliances, hiding from view the unattractive side of such appliances but allowing the signal emitted by the remote controls to pass. This is because the majority of domestic electrical/electronic appliances (televisions, hi-fis, DVD players, games consoles, and the like) are remote controllable using a housing which emits signals in the near infrared region. However, this remote control system exhibits in particular two disadvantages: (i) the signal is often disrupted by the presence of secondary radiation in the visible region (sun, lights), which render it less sensitive, and (ii) it requires that the appliances be reachable by the IR signal of the remote control and thus these cannot be concealed inside an item of furniture, even if demand is nevertheless proceeding in this direction for aesthetic reasons.

Embodiments of the invention will now be further described, by way of examples only, together with some comparative examples, not in accordance with the invention. The following examples are provided for illustrative purposes, and are not intended to limit the scope of this invention.

EXAMPLES

Different glass sheets/samples, according to the invention or comparative, were either (i) prepared in the lab ("lab"), or (ii) calculated/simulated ("simu"), with variable amounts of total iron, chromium, cobalt.

For the lab preparation of glass sheets: the starting materials were mixed in the powder form to produce about 240 g of an oxidized batch according to the following table, to which were added starting materials comprising total iron, chromium and cobalt in variable amounts as a function of the contents targeted in the final composition (it should be noted that the iron being already, at least in part, present in the starting materials of the base composition as impurity):

| Raw material | Amount (g.) |
|---|---|
| sand | 141-146 |
| limestone | 0-10.3 |
| dolomite | 39-52 |
| soda | 47-48 |

-continued

| Raw material | Amount (g.) |
|---|---|
| Alumina ($Al_2O_3$) | 0-2 |
| Coke | 0.1-0.12 |
| Sulfate ($Na_2SO_4$) | 2.2-3.3 |

The mixture was placed in a crucible and then heated up in an electrical furnace to a temperature allowing complete melting of the mixture.

The base glass composition finally obtained was:

| $SiO_2$ (wt %) | 70.8-72.2 |
|---|---|
| $Al_2O_3$ | 0-0.62 |
| CaO | 8.7-9.2 |
| MgO | 4.1-5.5 |
| $Na_2O$ | 13.7-14.3 |
| $SO_3$ | 0.25-0.37 |

The optical properties of each sample, moulded and processed in the form of a sheet, were determined on a Perkin Elmer Lambda 950 spectrophotometer equipped with an integrating sphere with a diameter of 150 mm, and in particular:
  the near-infrared transmission was determined according to the ISO9050 standard for a thickness of 4 mm at a solid angle of observation of 2° and for specific wavelengths, namely 850 nm ($T_{850}$), 900 nm ($T_{900}$) and 950 nm ($T_{950}$);
  the light transmission TL was also determined according to the ISO9050 standard for a thickness of 4 mm at a solid observation angle of 2° (with illuminant D65) and for a wavelength range between 380 and 780 nm.
  For the simulation/computation of glass sheets: the optical properties were computed on the basis of optical properties of different glass colorants (using linear absorption coefficient, determined for the concerned base glass matrix, to build the complete optical spectra and compute the parameters of interest). The base glass matrix considered in computation is the same as for lab samples.

Table 1 presents the composition features and optical properties for Examples 1 to 13.

Examples 1 to 5 and 13-14 correspond to comparative examples while Examples 6-12 correspond to glass sheets according to the invention. Specifically, Examples 1-2 (comparative) corresponds to glass with chromium and cobalt according to WO2015/091106.

Each Examples 6-12 according to the invention was optimized to reach:
  1) to maximize its transmission of near infrared radiation, especially at 850, 900 and/or 950 nm, to reach in particular values above 80% and better above 85%; while
  2) minimizing its visible transmission TL, in particular to reach values <15% and more preferably values below 10%, 5% (reaching then almost opacity), and
  3) low amounts of hexavalent chromium, $Cr^{6+}$ (especially, below 30 ppm and better below 20 ppm, and more better approaching zero).

TABLE 1

|  | Ex1 lab | Ex2 lab | Ex3 lab | Ex4 lab | Ex5 lab | Ex6 simu | Ex7 lab | Ex8 lab | Ex9 simu | Ex10 simu | Ex11 lab | Ex12 lab | Ex 13 lab | Ex 14 lab |
|---|---|---|---|---|---|---|---|---|---|---|---|---|---|---|
| $Fe_2O_3$ (wt %) | 0.009 | 0.009 | 0.106 | 0.014 | 0.132 | 0.17 | 0.19 | 0.131 | 0.5 | 0.8 | 0.19 | 0.345 | 0.245 | 0.472 |
| $Cr_2O_3$ (wt %) | 0.81 | 0.69 | 0.47 | 0.10 | 0.2 | 0.2 | 0.19 | 0.1 | 0.3 | 0.47 | 0.10 | 0.18 | 0.1 | 0.2 |
| Co (wt %) | 0.008 | 0.065 | 0.068 | 0.1 | 0.1 | 0.1 | 0.1 | 0.1 | 0.05 | 0.07 | 0.1 | 0.1 | 0.1 | 0.1 |
| TLD4 (%) | 16.4 | 2.4 | 3 | 2.7 | 2.1 | 2.3 | 2.3 | 2.9 | 7.5 | 2.8 | 2.6 | 2.4 | 3.1 | 2.3 |
| $T_{850}$ (%) | 72.9 | 69.3 | 84.7 | 89.1 | 87.8 | 89.1 | 87.5 | 89 | 87.8 | 85.4 | 88.3 | 83.5 | 80.5 | 67.8 |
| $T_{900}$ (%) | 76.7 | 72.1 | 86.7 | 88.3 | 87.5 | 88.3 | 87.5 | 88.1 | 88.6 | 86.8 | 87.6 | 83 | 78.9 | 66 |
| $T_{950}$ (%) | 77.1 | 71.3 | 86.3 | 86.8 | 86 | 84.5 | 85.5 | 86.5 | 87 | 84.6 | 86 | 81.2 | 77.2 | 64.3 |
| 1-5.5 * Co | 0.96 | 0.64 | 0.63 | 0.45 | 0.45 | 0.45 | 0.47 | 0.45 | 0.73 | 0.615 | 0.45 | 0.47 | 0.45 | 0.45 |
| $Cr_2O_3/Fe_2O_3$ | 90.00 | 76.67 | 4.43 | 7.29 | 1.52 | 1.18 | 1.00 | 0.76 | 0.60 | 0.59 | 0.54 | 0.52 | 0.41 | 0.42 |
| $Cr^{6+}$ (ppm) | 549 | 467 | 280 | 70 | 85 | 22 | 25 | 17 | 12 | 13 | 1 | 1 | 0 | 0 |
| FeO (ppm) | 0 | 0 | 1 | 0 | 2 | 4 | 3 | 2 | 15 | 27 | 12 | 31 | 114 | 199 |

The objective of the invention, namely getting 1), 2) and 3) in a glass sheet can be reached, as shown by the results from table 1 with the features of claim 1.

The invention claimed is:

1. A glass sheet of silicate-type having a composition comprising, in a content expressed as weight percentages, by total weight of glass:

| | |
|---|---|
| $SiO_2$ | 40-78%; |
| $Al_2O_3$ | 0-18%; |
| $B_2O_3$ | 0-18%; |
| $Na_2O$ | 0-20%; |
| CaO | 0-15%; |
| MgO | 0-10%; |
| $K_2O$ | 0-10%; |
| BaO | 0-5%; |
| total iron (expressed as $Fe_2O_3$) | 0.04-1.7%; |
| Chromium (expressed as $Cr_2O_3$) | 0.05-0.8%; and |
| Cobalt (expressed as Co) | 0.03-0.175%, | wherein
$Cr_2O_3 < 1-5.5Co$, and $0.5 < Cr_2O_3/Fe_2O_3 \leq 1.2$, and
the glass sheet has a $T_{850}$ higher than 80%.

2. The glass sheet according to claim 1, wherein chromium-(expressed as $Cr_2O_3$) $\leq 0.5\%$.

3. The glass sheet according to claim 1 wherein chromium (expressed as $Cr_2O_3$) $\leq 0.3\%$.

4. The glass sheet according to claim 1, wherein chromium (expressed as $Cr_2O_3$) $\geq 0.1\%$.

5. The glass sheet according to claim 1, wherein total iron (expressed as $Fe_2O_3$) $\leq 1.2\%$.

6. The glass sheet according to claim 1, wherein total iron (expressed as $Fe_2O_3$) $\geq 0.08\%$.

7. The glass sheet according to claim 1, wherein total iron (expressed as $Fe_2O_3$) $\geq 0.1\%$.

8. The glass sheet according to claim 1, wherein cobalt (expressed as Co) $\leq 0.12\%$.

9. The glass sheet according to claim 1, wherein the composition further comprises an $Fe^{2+}$ content (expressed in the form of FeO) of less than 40 ppm.

10. The glass sheet according to claim 1, wherein the glass sheet does not comprise nickel.

11. The glass sheet according to claim 1, wherein $Cr_2O_3/Fe_2O_3 \leq 1$.

12. The glass sheet according to claim 1, wherein $Cr_2O_3/Fe_2O_3 \leq 0.8$.

13. The glass sheet according to claim 1, wherein the glass sheet has a TLD4 lower than 10%.

14. The glass sheet according to claim 1, wherein the glass sheet has a $T_{850}$ higher than 85%.

15. A glass sheet of silicate-type having a composition comprising, in a content expressed as weight percentages, by total weight of glass:

| | |
|---|---|
| $SiO_2$ | 40-78%; |
| $Al_2O_3$ | 0-18%; |
| $B_2O_3$ | 0-18%; |
| $Na_2O$ | 0-20%; |
| CaO | 0-15%; |
| MgO | 0-10%; |
| $K_2O$ | 0-10%; |
| BaO | 0-5%; |
| total iron (expressed as $Fe_2O_3$) | 0.04-1.7%; |
| Chromium (expressed as $Cr_2O_3$) | 0.05-0.8%; and |
| Cobalt (expressed as Co) | 0.03-0.175%, | wherein
the glass sheet does not comprise nickel, and
$Cr_2O_3 < 1-5.5Co$, and $0.5 < Cr_2O_3/Fe_2O_3 \leq 1.2$, and
wherein the glass sheet has a TLD4 lower than 7%.

16. The glass sheet according to claim 15, wherein $Cr_2O_3/Fe_2O_3 \leq 0.8$.

17. A glass sheet of silicate-type having a composition comprising, in a content expressed as weight percentages, by total weight of glass:

| | |
|---|---|
| $SiO_2$ | 40-78%; |
| $Al_2O_3$ | 0-18%; |
| $B_2O_3$ | 0-18%; |
| $Na_2O$ | 0-20%; |
| CaO | 0-15%; |
| MgO | 0-10%; |
| $K_2O$ | 0-10%; |
| BaO | 0-5%; |
| total iron (expressed as $Fe_2O_3$) | 0.04-1.7%; |

-continued

| | |
|---|---|
| Chromium (expressed as $Cr_2O_3$) | 0.05-0.8%; and |
| Cobalt (expressed as Co) | 0.03-0.175%, | wherein
$Cr_2O_3 < 1$-$5.5Co$, and $0.5 < Cr_2O_3/Fe_2O_3 \le 1.2$, and colorants in the glass sheet consist essentially of iron, Chromium, and Cobalt.

18. The glass sheet according to claim 17, wherein $Cr_2O_3/Fe_2O_3 \le 0.8$.

19. The glass sheet according to claim 17, wherein the glass sheet has a TLD4 lower than 10%.

20. The glass sheet according to claim 17, wherein the glass sheet has a $T_{850}$ higher than 80%.

* * * * *